United States Patent
Naserian et al.

(10) Patent No.: US 10,391,939 B2
(45) Date of Patent: Aug. 27, 2019

(54) METHOD AND APPARATUS TO DETERMINE TRAILER POSE

(71) Applicant: GM GLOBAL TECHNOLOGY OPERATIONS LLC, Detroit, MI (US)

(72) Inventors: Mohammad Naserian, Windsor (CA); Shuqing Zeng, Sterling Heights, MI (US); Jay H. Sim, Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 156 days.

(21) Appl. No.: 15/254,191

(22) Filed: Sep. 1, 2016

(65) Prior Publication Data

US 2018/0056868 A1    Mar. 1, 2018

(51) Int. Cl.
*B60R 1/00* (2006.01)
*B60R 1/078* (2006.01)
*G01B 11/00* (2006.01)

(52) U.S. Cl.
CPC ............... *B60R 1/00* (2013.01); *B60R 1/002* (2013.01); *B60R 1/003* (2013.01); *B60R 1/078* (2013.01); *G01B 11/002* (2013.01); *B60R 2300/80* (2013.01)

(58) Field of Classification Search
CPC ... B60R 1/003; B60R 1/078; B60R 2300/808; B60R 1/002
USPC ........................................................ 348/148
See application file for complete search history.

(56) References Cited

U.S. PATENT DOCUMENTS

| | | | | |
|---|---|---|---|---|
| 2003/0234512 | A1* | 12/2003 | Holub | B60D 1/36 280/432 |
| 2006/0044122 | A1* | 3/2006 | Dialinakis | B60D 1/36 340/431 |
| 2008/0231701 | A1* | 9/2008 | Greenwood | B60R 1/00 348/148 |
| 2008/0231980 | A1* | 9/2008 | Beale | B60R 1/002 359/843 |
| 2009/0005932 | A1* | 1/2009 | Lee | B60D 1/30 701/41 |
| 2014/0160276 | A1* | 6/2014 | Pliefke | B60R 1/00 348/118 |
| 2015/0217693 | A1* | 8/2015 | Pliefke | B60R 1/00 348/118 |
| 2016/0052548 | A1* | 2/2016 | Singh | B60D 1/36 701/37 |
| 2016/0059780 | A1* | 3/2016 | Lavoie | B60R 1/00 348/118 |

(Continued)

FOREIGN PATENT DOCUMENTS

JP     2002068032 A   *  3/2002

OTHER PUBLICATIONS

"Trailer Lighting Requirements"; May 10, 2015; etrailer.com; available at https://www.etrailer.com/faq-trailer-lighting-info-and-regulations.aspx (Year: 2015).*

*Primary Examiner* — Jeremiah C Hallenbeck-Huber
(74) *Attorney, Agent, or Firm* — Lorenz & Kopf LLP

(57) ABSTRACT

A system and method to determine trailer pose includes imaging first and second telltales affixed to a trailer to provide trailer image data. A controller is operable to determine trailer pose from the trailer image data. The trailer pose information may be provided to one or more controllers of a vehicle towing the trailer.

11 Claims, 9 Drawing Sheets

(56) References Cited

U.S. PATENT DOCUMENTS

| | | | |
|---|---|---|---|
| 2016/0059888 A1* | 3/2016 | Bradley | B60T 7/22 |
| | | | 701/41 |
| 2016/0059889 A1* | 3/2016 | Herzog | B62D 13/06 |
| | | | 701/41 |
| 2016/0159176 A1* | 6/2016 | McCormick | B60D 1/36 |
| | | | 701/302 |
| 2017/0043806 A1* | 2/2017 | Muharemovic | B62D 13/06 |
| 2017/0123431 A1* | 5/2017 | Ghneim | B60W 10/04 |
| 2017/0158233 A1* | 6/2017 | Herzog | B60K 37/06 |
| 2017/0247053 A1* | 8/2017 | Lavoie | B62D 13/06 |
| 2017/0297619 A1* | 10/2017 | Lavoie | B62D 6/002 |
| 2017/0341583 A1* | 11/2017 | Zhang | G06T 7/73 |

\* cited by examiner

METHOD AND APPARATUS TO DETERMINE TRAILER POSE

TECHNICAL FIELD

This patent generally relates to trailering systems for vehicles, and more particularly, this patent relates to methods and apparatus to determine the pose of a towed trailer.

BACKGROUND

Vehicles may incorporate and utilize numerous aids to assist the operator. For example, lane departure, collision avoidance, rear and side imaging systems inform and alert the driver to conditions around and about the vehicle as it is operated and under certain circumstances actively intervene in the operation of the vehicle. Anti-lock braking, stability control, adaptive speed control may also actively intervene in the control and operation of the vehicle, often in the background and transparent to the operator. Optimization of these vehicle operating, alert and information systems while the vehicle is engaged to tow a trailer requires accurate, real time information of the trailer pose, i.e., the angle of the trailer relative to the towing vehicle and length of the trailer.

Accordingly, it is desirable to provide methods and systems to determine trailer pose in real time. Furthermore, the system and methods should require a minimum amount of operator intervention and data entry to configure and calibrate. To reduce complexity and cost, the systems and methods should utilize existing vehicle systems and devices, such as for example, imaging, parking assist and other such systems. Other desirable features and characteristics of the herein described embodiments will become apparent from the subsequent detailed description and the appended claims, taken in conjunction with the accompanying drawings and the foregoing technical field and background.

SUMMARY

In one exemplary embodiment, a system to determine trailer pose includes first and second telltales affixable to a trailer. An imaging system is operable to detect the first and second telltales and to indicate at least one geometric relationship between the telltales and the imaging system and to provide trailer image date. A controller coupled to the imaging system receives the trailer image data. The controller is operable to determine from the trailer image data the trailer pose.

In another embodiment, the system includes a vehicle arranged to tow the trailer, and the imaging system and the controller are disposed on or within the vehicle.

In another exemplary embodiment, a method of determining trailer pose includes imaging telltales disposed on a trailer to provide trailer image data. From the trailer image data, the trailer pose is determined.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
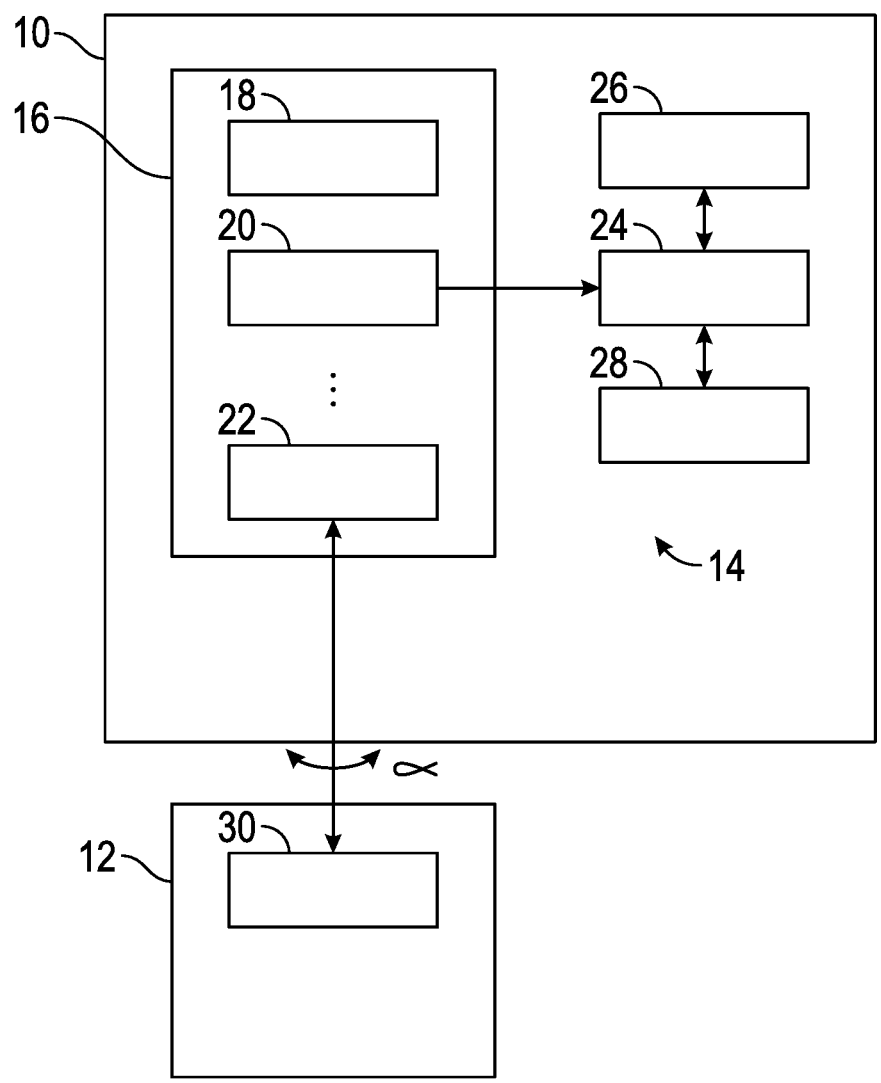
FIG. 1 is a schematic illustration of a system to determine trailer pose in accordance with a herein described exemplary embodiment.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that contains one or more executable software or firmware programs and associated data, a combinational logic circuit, and/or other suitable components that provide the described functionality.

Embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of mechanical components, e.g., towing apparatus, indicators or telltales; and electrical components, e.g., integrated circuit components, memory elements, digital signal processing elements, logic elements, look-up tables, imaging systems and devices or the like, which may carry out a variety of functions under the control of one or more microprocessors or other control devices. In addition, those skilled in the art will appreciate that the herein described embodiments may be practiced in conjunction with any number of mechanical and/or electronic systems, and that the vehicle systems described herein are merely exemplary.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Referring to FIG. 1 a vehicle 10 and a towed trailer 12 are depicted schematically. The trailer 12 is coupled for towing to the vehicle 10 by conventional structure that typically includes a trailer tongue extending forward from the trailer 12 that couples to a hitch/towing ball secured to the vehicle 12. In fact, the systems and methods herein described may be employed with virtually any towing accommodation. Therefore, such conventional towing structures are omitted from the drawings for clarity in view of the additional drawing detail to be described below.

The alignment of the trailer 12 behind the towing vehicle 10, i.e., the angle the trailer 12 forms relative to the vehicle 10 is referred to herein as the trailer pose. The trailer pose extends from aligned with the vehicle 10, i.e., trailer pose being zero degrees (trailer pose=0°) to the trailer 12 forming a plus or minus angle α to the vehicle 10 (trailer pose=±α). The range of the angle α for a given vehicle 10/trailer 12 combination is fixed by the towing structure.

The vehicle 10 includes a system 14 to determine trailer pose that in accordance with the herein described embodiments utilizes existing vehicle systems. It will be appreciated, however, that should the vehicle should not originally incorporate the devices herein described, that such devices may be added to the vehicle as aftermarket equipment, for example.

The system 14 includes imaging system 16 that may include rear viewing camera 18, outside side rear view (OSRV) mirror mounted cameras 20, and inside driver mirror camera 22. While described as cameras, the imaging system 16 may use other optical imaging devices or sensor based imaging devices may be employed, and the imaging system 16 may use various combinations of cameras, imaging devices and sensors without departing from the herein described embodiments.

Figure 2:
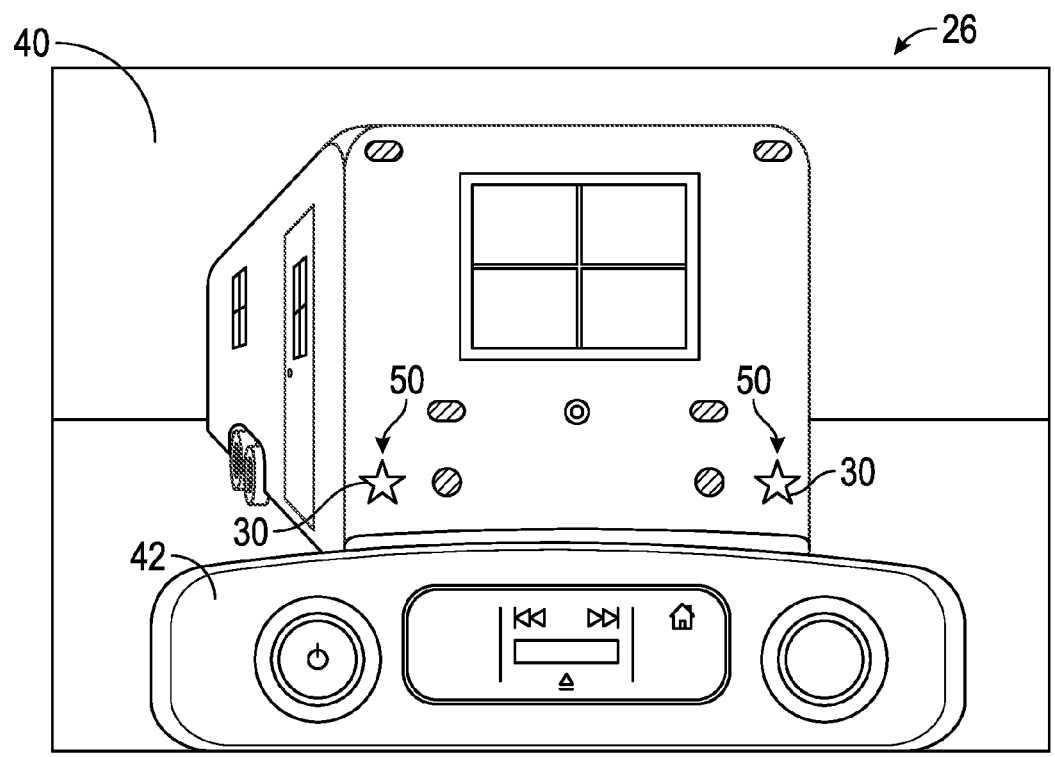
FIG. 2 is a graphic illustration of a display that may be adapted in accordance with the herein described exemplary embodiment.
Figure 3:
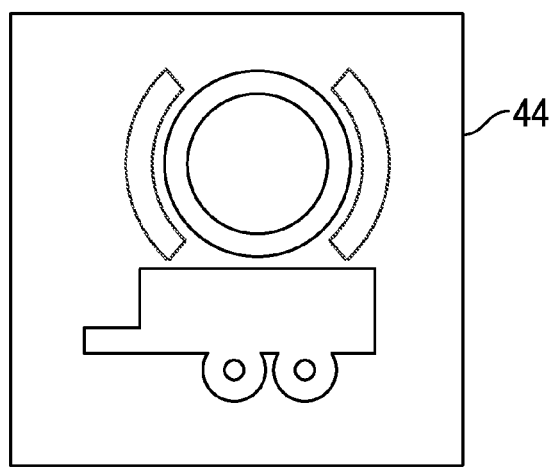
FIG. 3 is a graphic illustration of a status icon that may be used in connection with systems and methods in accordance with the herein described exemplary embodiment.

The imaging system 16 is coupled to a controller 24, which is further coupled to an operator interface 26. The controller 24 may be typical of the various types of controllers commonly found within a motor vehicle and may include a general purpose or application specific processing device, memory and input/output interfaces (not depicted). Alternatively, the herein described functionality may be incorporated into one or more existing controllers such as a body controller, infotainment/telematics controller, powertrain controller and the like. The controller 24 may further be coupled to one or more of these afore-mentioned controllers, generally indicated as controller 28. The controller 24 may include memory or be coupled to memory (not depicted) that may be configured to have a portion to retain operating instructions for the processing device and data used in connection with operation of the system 14. The operator interface 26 may be one or more displays 40 (see FIG. 2) as are commonly found within vehicles associated with infotainment/navigation/rear camera systems. The operator interface 26 may further include, without limitation, taken alone or in combination with other visual, haptic and audible indicators. The operator interface 26 may also include data entry structures 42, e.g., knobs, buttons, virtual keypad or voice recognition, to accept user data. Furthermore, a status icon 44 (see FIG. 3) may be depicted on the operator interface 26, or otherwise within the view of the vehicle operator to indicate the system 14 is operative and calibrated.

The imaging system 16 is operable to image the trailer 12, and in particular, specific, pre-identified points on the trailer 12 and provide trailer image data to the controller 24. To facilitate imaging the pre-identified points on the trailer 12, unique stickers, appliques or telltales (hereinafter referred to as stickers 30) may be positioned on the trailer, and the imaging system 16 configured to identify the stickers 30 to provide the trailer image data.

Figure 4:
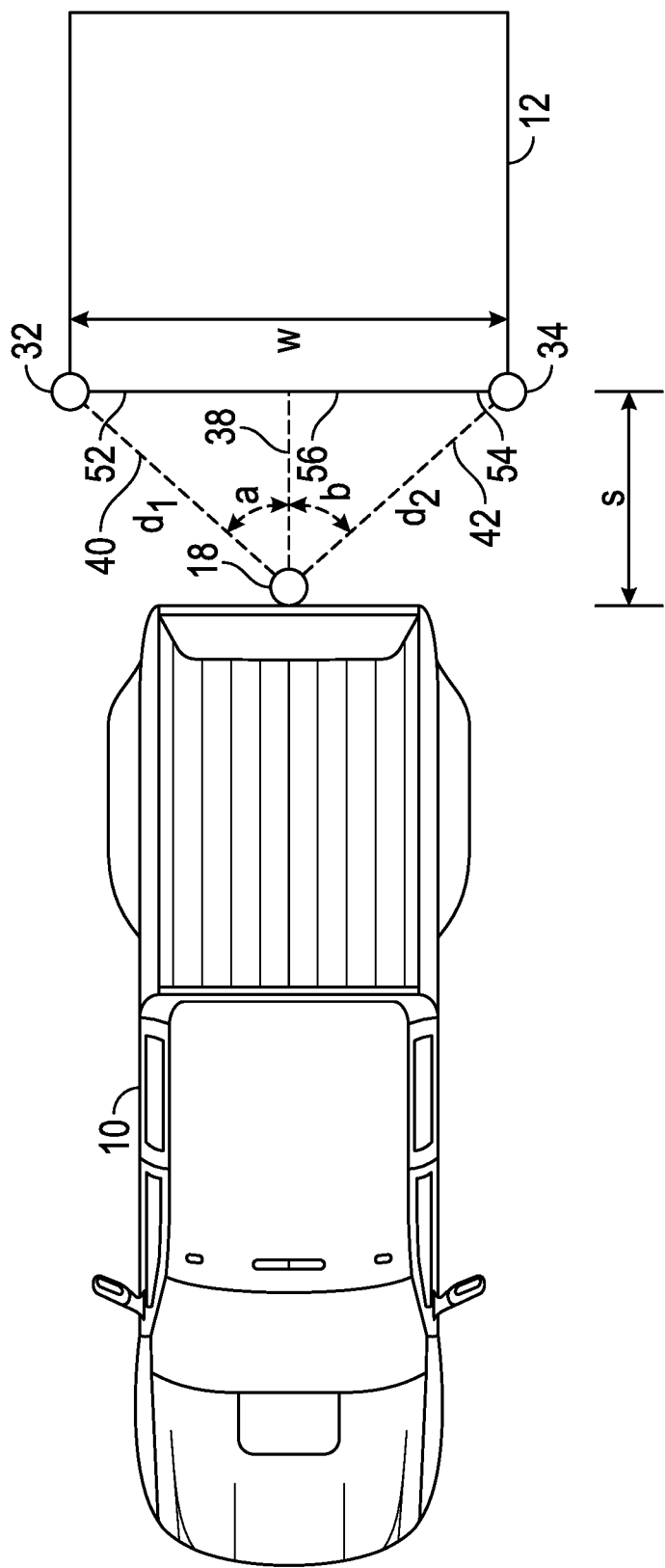
FIGS. 4-6 are schematic illustrations of a tow vehicle and a towed trailer that may be adapted in accordance with herein described exemplary embodiments illustrating a system and method to determine trailer pose.
Figure 5:
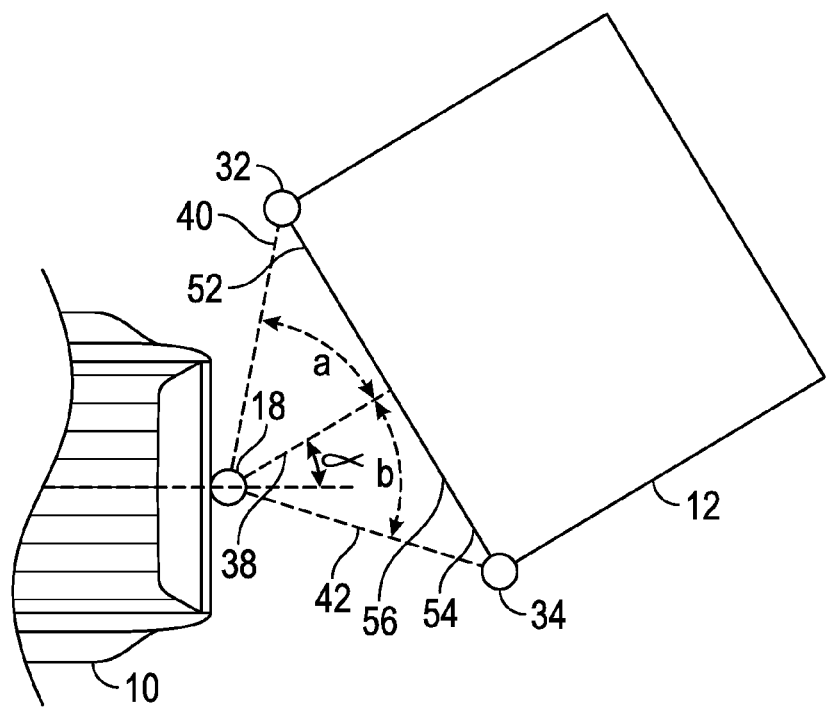
Figure 6:
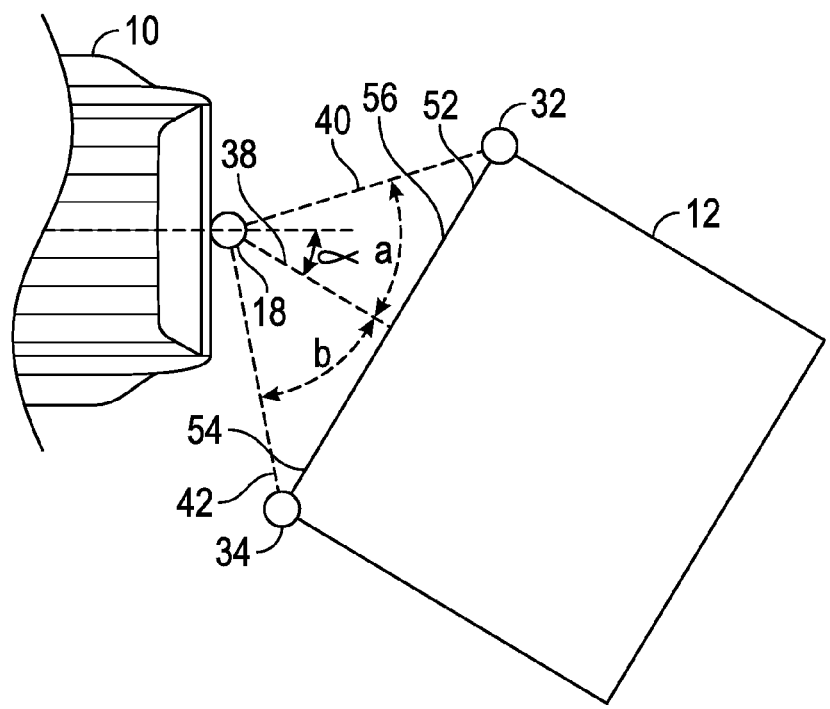

In the exemplary embodiment depicted in FIGS. 4-6, two specific, pre-defined points 32 and 34 on the trailer 12 are identified by stickers 30. The imaging system 16 includes rear camera 18. By identifying the points 32 and 34, the system 14 is operable to determine trailer image data including distance from the camera 18 to the points 32 and 34. From the trailer image data the system 14 is operable to determine the trailer pose α.

In its simplest form, the trailer image data allows determination of at least one geometric relationship between the imaging system 16, e.g., the camera 18, and the stickers 30. For example, it is possible to provide the distance from the camera 18 to the point 32, $d_1$, and the distance from the camera 18 to the point 34, $d_2$. The trailer width, w, and the length of the trailer tongue, h, are known or are determinable values. It is therefore possible to determine the angel, indicated as "a" in FIGS. 4-7, formed between a longitudinal axis 38 of the trailer 12, and a line 40 from the camera 18 to the point 32. Similarly, it is possible to determine an angle indicate as "b" in FIGS. 4-7, formed between the longitudinal axis 38 of the trailer 12, and a line 42 from the camera 18 to the point 34.

With continued reference to FIGS. 4-6, in a simple estimate, it is possible to determine if the trailer pose is: trailer 12 is aligned with the vehicle 10 when $d_1=d_2$; a=b, therefore, α=0; trailer 12 is angled toward the right side of vehicle 10 when $d_1<d_2$; a<b, therefore, α>0; or trailer 12 is angled toward the left side of vehicle 10 when d1>d2; a>b, therefore, α<0.

Figure 7:
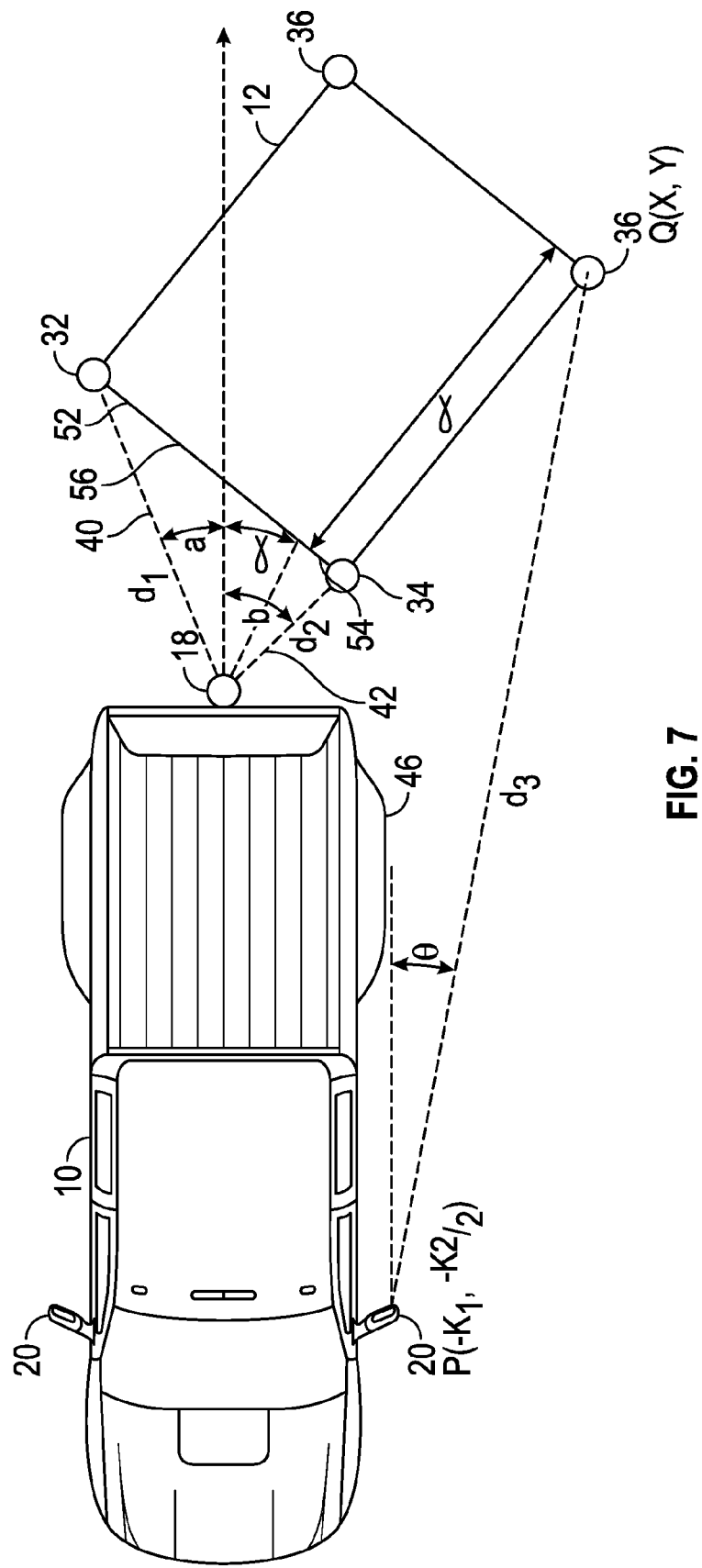
FIGS. 7-8 are schematic illustrations of a tow vehicle and a towed trailer that may be adapted in accordance with herein described exemplary embodiments illustrating a system and method to determine trailer pose.
Figure 8:
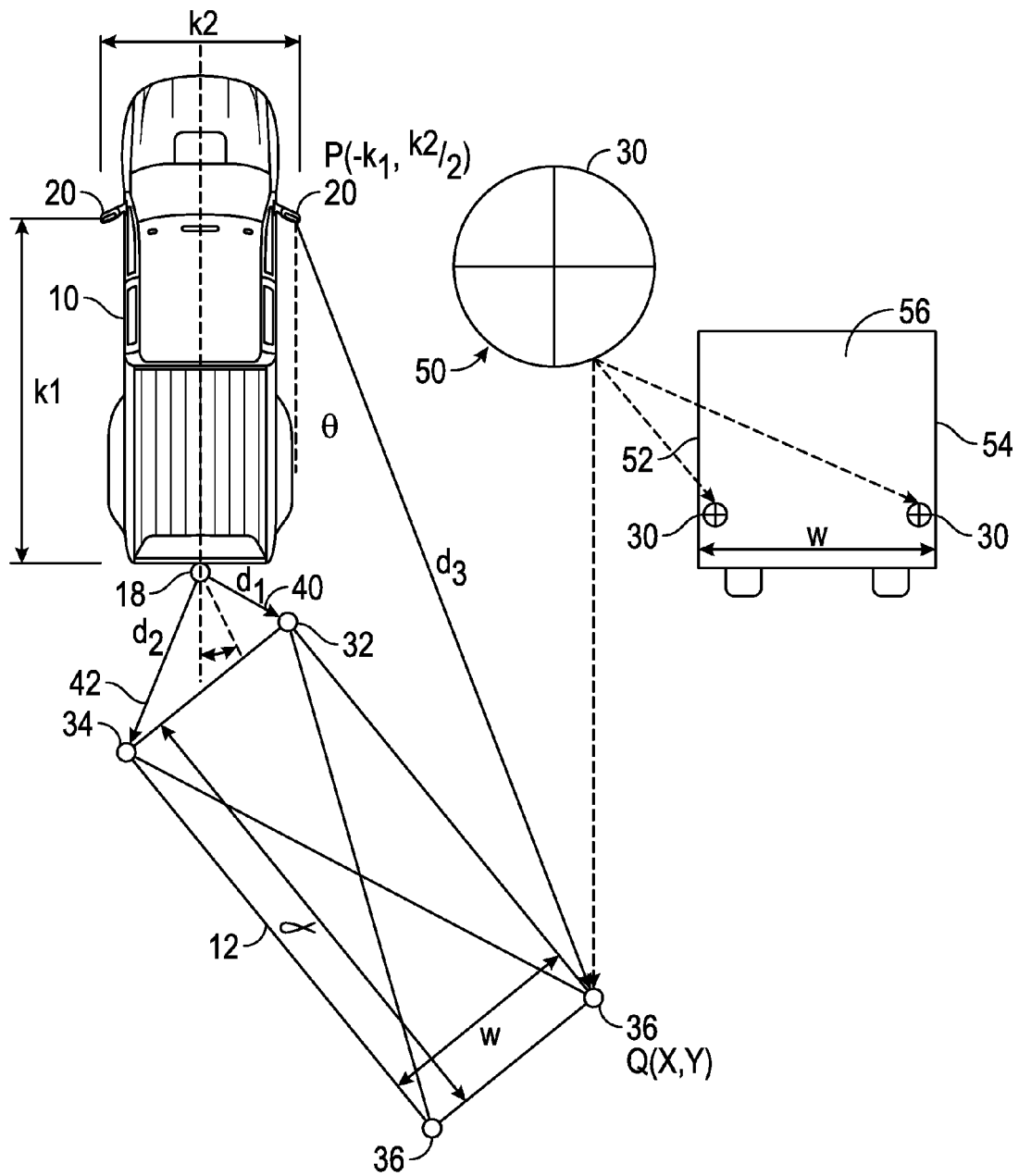

In an alternative exemplary embodiment depicted in FIGS. 7 and 8, there are three specific, pre-defined points 32, 34 and 36 on the trailer 12 identified by stickers 30. The imaging system 16 includes rear camera 18 and OSRV mirror camera 20. By identifying the points 32, 34 and 36, the system 14 is operable to determine trailer image data including distance from the camera 18 to the points 32 and 34, and the distance from the camera 20 to the point 36. The trailer image data ultimately allows determination of the trailer pose α. It is furthermore possible to know the distance d3 to the rear of the trailer 12, and the angle of the trailer 12 to the side 46 of the vehicle 10, θ.

The system 14 requires set up and calibration, which can be accomplished substantially automatically with minimal operator intervention. If the stickers 30 are not already affixed to the trailer 12, the operator will need to affix the stickers 30 to the trailer 12. The stickers 30 may be obtained from a supplier of the same, for example, from the vehicle manufacturer. The stickers 30 may further be provided as a kit that may be obtained upon purchase of the vehicle 10 or as an aftermarket purchase. An exemplary kit may include a number of stickers 30, at least 2, but potentially more permitting configuration of several trailers. The kit may further include instructions for affixing the stickers to the trailer and for enabling and calibrating the trailer pose determination functionality.

The stickers 30 may be a multiple layer, weather resistant vinyl or other suitable material with an adhesive with a peel-away backing (not depicted). The stickers 30 may have a unique logo, design, color scheme, shape or combinations thereof (50 depicted in FIGS. 2 and 8) to facilitate identification and to avoid false indications. Depending upon the operation of the imaging system 16, the stickers 30 may be highly reflective, partially reflective or non-reflective, may filter one or more light wave bands, or may otherwise be configured to enhance detection of the stickers 30 by the imaging system 16.

As depicted in the various FIGs. and best seen in FIG. 8, the stickers 30 are affixed at outer edges 52 and 54 of a forward surface 56 of the trailer 12. The stickers 30 should be spaced to substantially identify the width, w, of the trailer 12 at points 32 and 34. A third or fourth sticker 30 may be affixed at point 36 to reflect a calculated length, l, of the trailer 12 (FIGS. 7-8).

Figure 9:
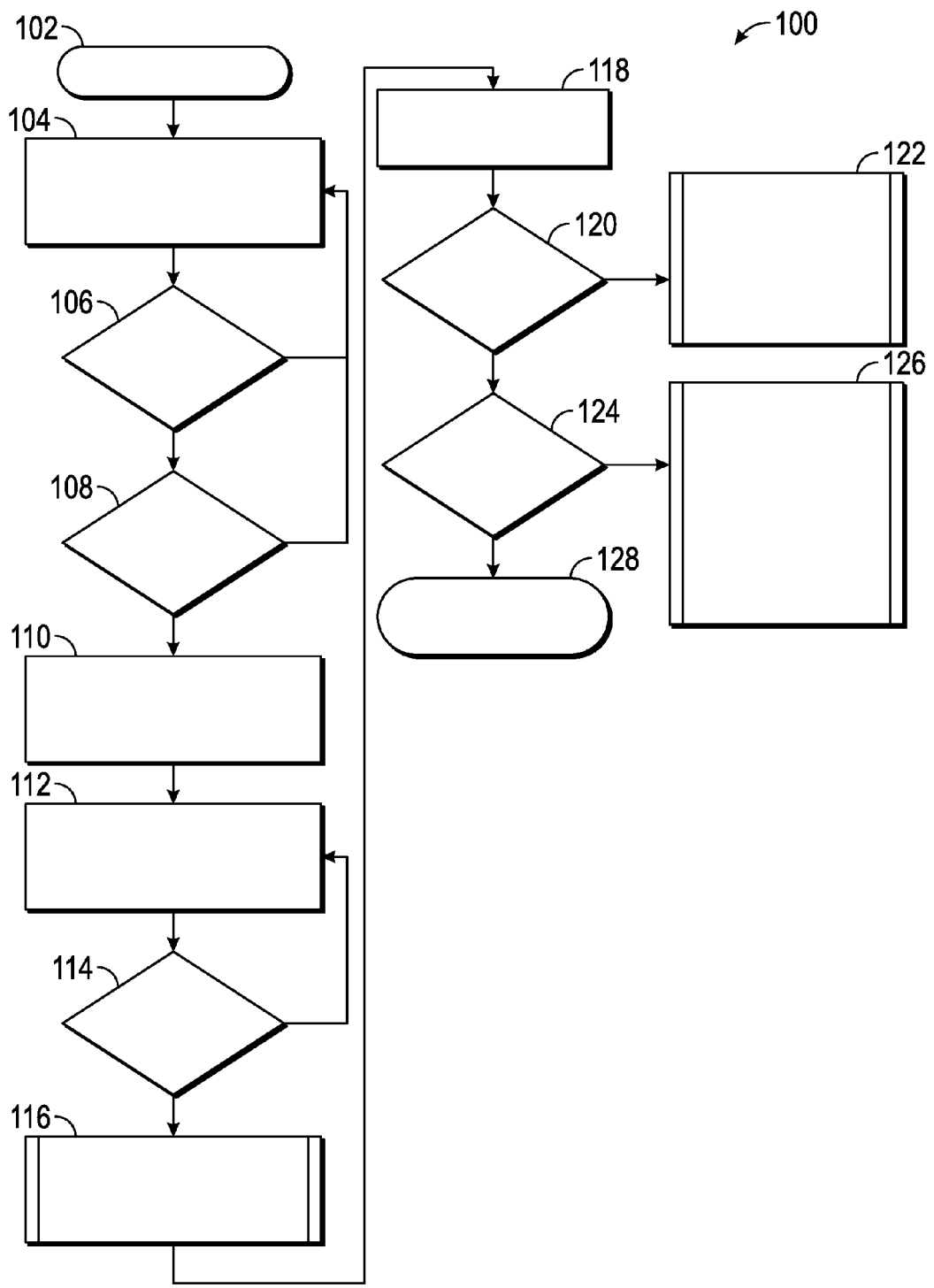
FIGS. 9-10 are a block diagram illustrations of a setup and initialization method in accordance with the herein described exemplary embodiments.

With the stickers 30 affixed to the trailer 12, and the trailer 12 coupled to the vehicle 10, referring now to FIG. 9, an operator via the operator interface 26 initializes 102 a set up and calibration process 100. The process first has the operator confirm, 104, the stickers 30 are affixed to the trailer 12. If the operator responds no at 106, the process awaits an affirmative answer. If the operator responds yes at 106, the system 14 via the imaging system 16 attempts to detect the stickers 30. If the stickers 30 are not detected at 108, the process returns to have the operator confirm the stickers 30 are properly affixed. If the stickers 30 are detected at 108, the process advances to obtain additional calibration data.

At 110, the operator may optionally enter the trailer 12 width, w. However, entry of the width is not required and may be skipped if so selected by the operator. Next, the operator is requested to drive the vehicle 10 and the trailer 12 slowly, straight for a predetermined period of time or distance, 112. That the vehicle 10 is being driven straight may optionally be confirmed by verification that the steering wheel angle is zero degrees (0°) by receiving data via the controller 24 from other vehicle controllers 28, 114. This is a process to align the vehicle 10 and the trailer 12 for calibration, i.e., to ensure the trailer pose is aligned, α=0.

With the vehicle 10 and the trailer 12 aligned, the distances $d_1$ and $d_2$, described above, and the angles a and b, also described above, are determined, 116. Next the operator's response to the inquiry as to the trailer 12, width w, is considered, 118. If the operator has entered If the driver has entered the trailer width, w, 120, an estimate of the trailer tongue length h is made according to the formula:

$$h = \frac{w}{2\tan a} - \frac{w}{2\tan b}.$$

If the operator elected not to provide the trailer 12, width w, at 124 an estimate, 126, of both the trailer 12, width w and the trailer tongue length h is made according to the formulas:

$$h = d_1 \cos a = d_2 \cos b$$

$$w = 2d_1 \sin a = 2d_2 \sin b.$$

Thus, with confirmation the stickers 30 are affixed to the trailer 12 and detected by the system 14, and with the values of w and h provided or made, the system 14 is calibrated and initialized, 128.

Figure 10:
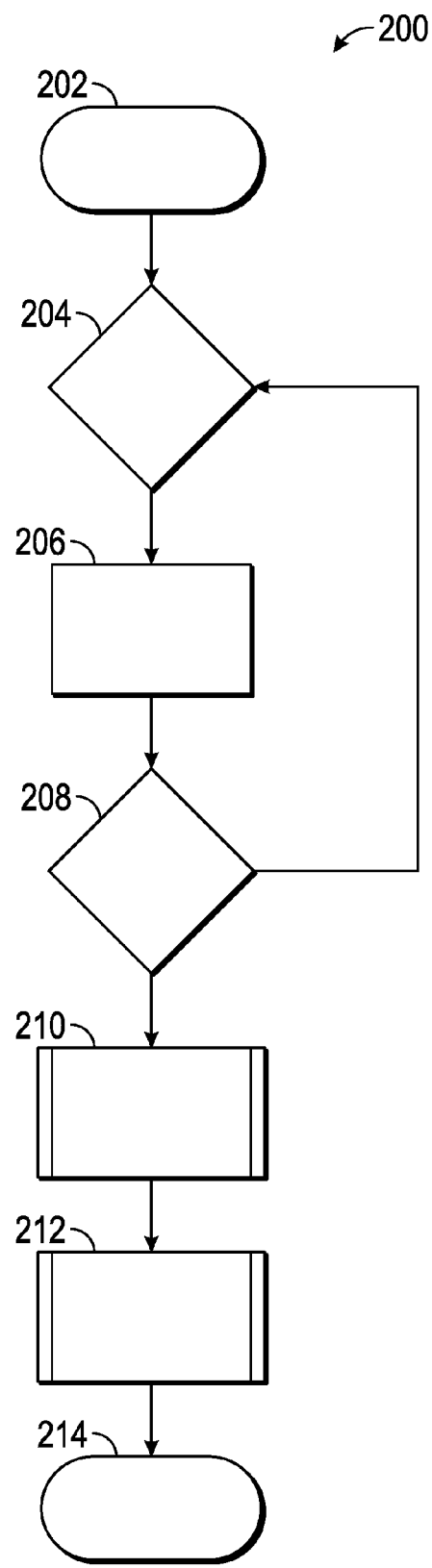

With reference again to FIGS. 7 and 8 and the values h, l, w, $k_1$ and $k_2$ and geometric locations P and Q depicted therein, and as well with reference to FIG. 10, the system 14 may further as part of the calibration process include a process 200 to determine the length, l, of the trailer 12.

The process begins at 202 and at 204 it is confirmed that the first calibration process, process 100 depicted in FIG. 9, is complete. At 206, the vehicle operator is asked to position the vehicle 10 and the trailer 12 to ensure a positive or negative trailer pose, i.e., α≠0. The stickers 30 are detected, 206, and the angle θ and the distance d3 is calculated, 208. The distance $d_3$ is related to the values: h, l, w, α, $k_1$ and $k_2$ as follows:

$$d_3^2 = \left((h+l)\cos\alpha + \frac{w}{2}\sin\alpha + k_1\right)^2 + \left((h+l)\sin\alpha - \left(\frac{w}{2}\right)\cos\alpha + \frac{k_2}{2}\right)^2$$

which allows for an initial estimation of the length, l, of the trailer 12, 212. With that, the process 200 ends at 214.

Alternatively, with the data acquired in 204 and 208, and with the values $k_1$ and kl, it is possible at 212 instead to calculate the length, l, of the trailer 12 according to the following:

$$Q = \begin{bmatrix} x \\ y \end{bmatrix} P = \begin{bmatrix} -k_1 \\ -\frac{k_2}{2} \end{bmatrix}$$

$$Q = \begin{bmatrix} x \\ y \end{bmatrix} = \begin{bmatrix} \cos\alpha & -\sin\alpha \\ \sin\alpha & \cos\alpha \end{bmatrix} \cdot \begin{bmatrix} h+l \\ -\frac{w}{2} \end{bmatrix} = \begin{bmatrix} (h+l)\cos\alpha + \frac{w}{2}\sin\alpha \\ (h+l)\sin\alpha - \left(\frac{w}{2}\right)\cos\alpha \end{bmatrix}$$

$$\|P - Q\| = d_3$$

$$d_3^2 = \left((h+l)\cos\alpha + \frac{w}{2}\sin\alpha + k_1\right)^2 + \left((h+l)\sin\alpha - \left(\frac{w}{2}\right)\cos\alpha + \frac{k_2}{2}\right)^2$$

⇓

Solve for l

Figure 11:
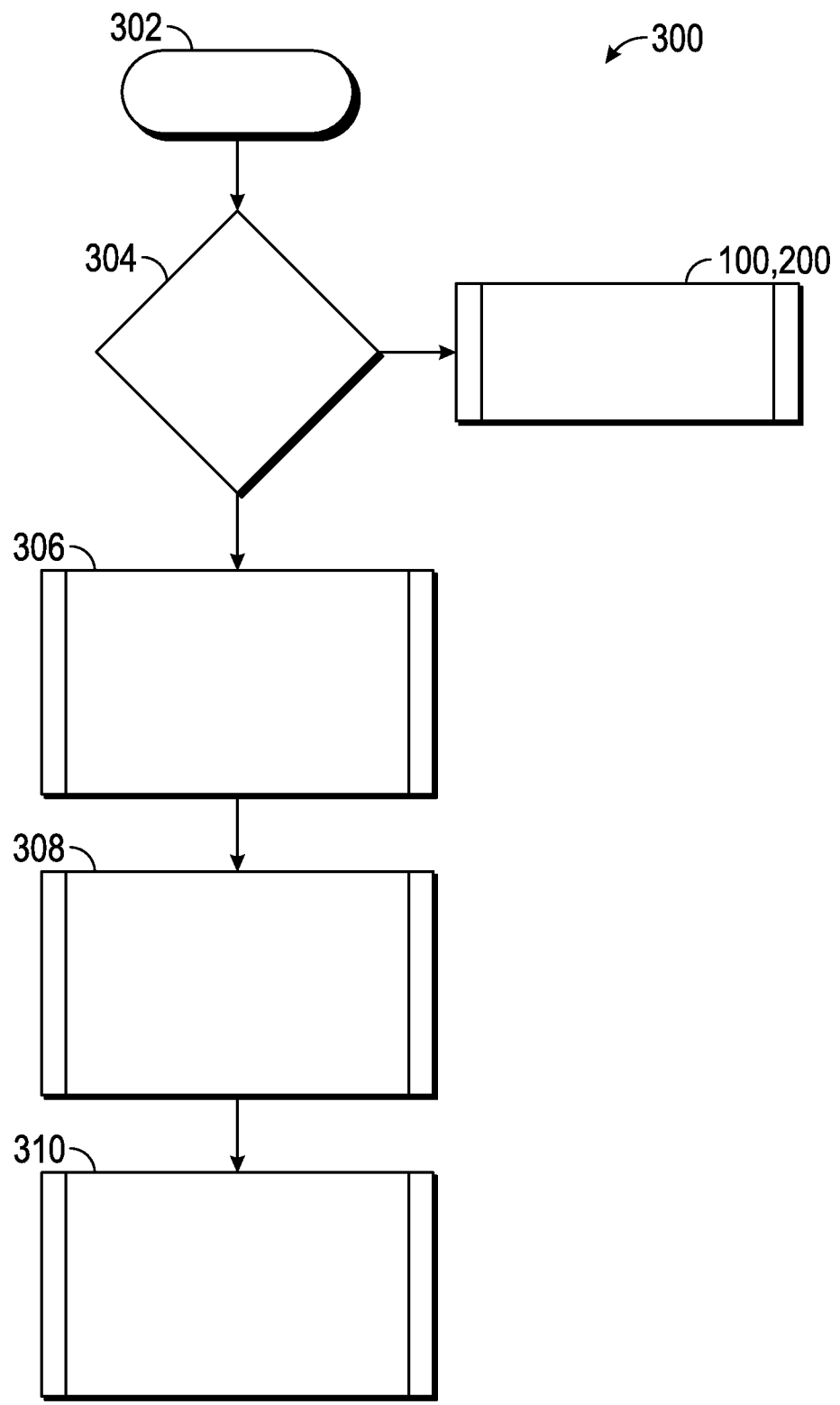
FIG. 11 is a block diagram illustrations of a method to determine trailer pose in accordance with a herein described exemplary embodiment.

Referring to FIG. 11, during normal towing operation of the vehicle 10, the trailer pose determination process 300 starts 302 by confirming the system 14 is calibrated and initialized 304. If the system 14 is not calibrated and initialized, processes 100 (FIG. 9) and 200 (FIG. 10) are started. Otherwise, the system 14 operates, 306, to continuously determine trailer pose, a, according to the formulas:

$$\alpha = \cos^{-1}\frac{h}{d1} - a$$

$$\alpha = b - \cos^{-1}\frac{h}{d2}.$$

With the trailer pose α determined real time, this information along with trailer 12 width, w, and length, l, information 308 is made available via controller 24 to other vehicle controllers 28, 310. Therefore, it is possible to modify or optimize braking, stability, sway control and other systems in view of the trailer pose. Additionally, autonomous vehicle 10 towing operation is possible, including automated trailer backing as is enhanced operator assisted trailer backing. System 14 requires a minimum of operator interaction and/or input to setup, initialize and calibrate. Using existing vehicle 10 imaging and sensor systems allows the system to be adapted to many vehicles with minor modifications and/or additions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system to determine trailer pose comprising:
    first, second and third telltales affixable to a trailer, the first and second telltales being affixed to the trailer at respective outer edges of a front surface of the trailer such that the first telltale is affixed at a first outer edge and the second telltale is affixed at a second outer edge, different from the first outer edge, the first and second outer edges defining a width of the front surface and hence a width of the trailer, and the third telltale is affixed to a side surface of the trailer at a rear portion of the trailer defining a length of the trailer between one of the first and second telltales and the third telltale;
    an imaging system operable to detect the first, second and third telltales and to indicate at least one geometric relationship between the telltales and the imaging system and to provide trailer image date;
    a controller coupled to the imaging system to receive the trailer image data, the controller configured to determine from the trailer image data the trailer pose,
    wherein the controller is configured to determine a trailer width, w, based upon an imaged first distance of the image data from a first point on a tow vehicle to the first telltale and a second imaged distance of the image data from the first point on the tow vehicle and the second telltale, and to determine a trailer length, l, based upon the width, w, and a third imaged distance of the image data from a second point on a tow vehicle and the third telltale;
    the controller is further configured to determine trailer pose as an angle of a longitudinal axis of the trailer relative to the first point on the tow vehicle using at least the width, w, and,
    the controller is further configured to provide in real time the trailer pose and the trailer length, l, to a controller operably associated with the tow vehicle.

2. The system of claim 1, wherein the telltales include an identifiable image or shape.

3. The system of claim 1, wherein the telltales have a unique identifiable color.

4. The system of claim 1, wherein the imaging system comprises a camera.

5. The system of claim 1, wherein the imaging system and the controller are disposed on or within the tow vehicle.

6. The system of claim 1, wherein the imaging system comprises a first camera associated with the tow vehicle and arranged to detect the first and second telltales, and a second camera associated with the vehicle and arranged to detect the third telltale.

7. The system of claim 5, the telltales being provided with the tow vehicle as a kit.

8. A method to determine trailer pose comprising:
    affixing first, second and third telltales to a trailer, the first and second telltales being affixed to the trailer at respective outer edges of a front surface of the trailer such that the first telltale is affixed at a first outer edge and the second telltale is affixed at a second outer edge, different from the first outer edge, the first and second outer edges defining a width of the front surface and hence a width of the trailer, and the third telltale is affixed to a side surface of the trailer at a rear portion of the trailer defining a length of the trailer between one of the first and second telltales and the third telltale;
    providing a controller coupled to an imaging device;
    imaging via the imaging device the first, second and third telltales affixed to the trailer to provide trailer image data;
    determining using the controller from the trailer image data the trailer pose by:
    determining using the controller a trailer width, w, based upon an imaged first distance of the image data from a first point on a tow vehicle to the first telltale and a second imaged distance of the image data from the first point on the tow vehicle and the second telltale;
    determining a trailer length, l, based upon the width, w, and a third imaged distance of the image data from a second point on a tow vehicle and the third telltale,
    determining using the controller trailer pose as an angle of a longitudinal axis of the trailer relative to the first point on the tow vehicle at least using the trailer width, w, and
    providing the trailer pose and the trailer length, l to at least one additional controller in real time.

9. The method of claim 8, wherein the telltales include an identifiable image or shape, and imaging comprises identifying the unique image or shape.

10. The method of claim 8, wherein the telltales include an identifiable color, and imaging comprises identifying the color.

11. The method of claim 8, wherein imaging comprises optically imaging.

* * * * *